United States Patent [19]
He

[11] Patent Number: 6,166,742
[45] Date of Patent: Dec. 26, 2000

[54] WAVELET-ASSISTED VOLUME RAY CASTING

[75] Inventor: Taosong He, Naperville, Ill.

[73] Assignee: Lucent Technologies, Inc., Murray Hill, N.J.

[21] Appl. No.: 09/096,995

[22] Filed: Jun. 13, 1998

[51] Int. Cl.$^7$ ..................................................... G06T 15/40
[52] U.S. Cl. .......................................... 345/421; 345/424
[58] Field of Search ................................... 345/421, 424, 345/426

[56] References Cited

U.S. PATENT DOCUMENTS

| | | |
|---|---|---|
| 4,964,103 | 10/1990 | Johnson . |
| 5,091,960 | 2/1992 | Butler ........................................... 382/1 |
| 5,136,690 | 8/1992 | Becker et al. ........................... 395/161 |
| 5,265,030 | 11/1993 | Skolnick et al. . |
| 5,594,842 | 1/1997 | Kaufman et al. . |
| 5,706,436 | 1/1998 | Lewis et al. ......................... 395/200.11 |
| 5,760,781 | 6/1998 | Kaufman et al. . |
| 5,887,139 | 3/1999 | Madison, Jr. et al. .............. 395/200.53 |

FOREIGN PATENT DOCUMENTS

| | | | |
|---|---|---|---|
| 0 612 025 | 8/1994 | United Kingdom ............ | G06F 15/72 |

OTHER PUBLICATIONS

Freund et al ("Accelerated Volume Rendering Using Homogenous Region Encoding": 0–8186–8262–0/97IEEE 1997).

Bae et al ("Managing Mobile Communication Network for Performance": 0–7803–4298–4/97: IEEE, 1997).

"Efficient Ray Tracing of Volume Data" Marc Levoy; ACM Transactions on Graphics vol. 9, No. 3, Jul. 1990, pp. 245–261.

"Accelerating Volume Animation by Space Leaping"; R. Yagel and Z. Shi; Proc. Visualization '93, San Jose CA Oct. 1993; pp. 62–69.

"Fast Algorithms for Volume Ray Tracing"; J. Danshin and P. Hanrahan; undated.

"A Theory for Multiresolution Signal Decomposition: The Wavelet Representation"; S. Mallat IEEE Transcatons on Pattern Analysis and Machine Intelligence, vol. 11, No. 7, Jul., 1989.

"Optical Models for Direct Volume Rendering"; N. Max; Univ. of California, Davis and Lawrence Livermore Laboratory; undated.

"VolVis: A Diversified Volume Visuaalization System"; R. Avlia, T. He, et. al.; State University of New York, Stony Brook; undated.

"A Multiresolution Framework for Volume Rensering"; R. Westerman; German National Research Center for Computer Science, Sankt Augustin, Germany; undated.

Taosong He Received Jul. 15, 1997 "Wavelet—Assisted Volume Ray Casting" Pacific Symposium on Bio–Computing, Jan. 12, 1998.

*Primary Examiner*—Mark Zimmerman
*Assistant Examiner*—Mano Padmanabhan.
*Attorney, Agent, or Firm*—Charles E. Graves

[57] ABSTRACT

This disclosure describes the use in telecommunications of a data processing technique for accelerating the calculation of data points in volume image rendering using volume ray casting, to create 3-dimensional data sets of network operational characteristics. Following basic data collection from a telecommunications network, for example, the 3-D discrete wavelet transform of the volume ray casting is performed on the data volume. Then, an "index" volume is pre-computed with the same resolution as the original data volume, and is the basis for setting the sampling rate (distance) at each voxel. The spatial-frequency locality of the wavelet coefficients is utilized to detect the maximum local frequency. From the latter, the appropriate sampling distance is chosen. The index volume information is applied to perform adaptive-sampling ray casting computations in the spatial domain. The volume rendering therefore can be approximated in a fast but controlled process. Systems and processes are disclosed illustrating use of the technique in telecommunications traffic monitoring and cell site RF interference assessment.

10 Claims, 9 Drawing Sheets

INDEX VOLUME FOR WAVELET RAY CASTING

| ε | HAAR | DAUBCH4 | BATTLE-LEMARIÉ |
|---|------|---------|----------------|
| 0 | 6.90 | 8.16 | 10.28 |
| 1 | 5.20 | 4.27 | 3.80 |
| 3 | 3.94 | 3.22 | 2.33 |
| 5 | 3.23 | 2.69 | 1.72 |
| 10 | 2.26 | 2.19 | 1.44 |

WAVELET-ASSISTED VOLUME RAY CASTING

FIELD OF THE INVENTION

This invention relates to computer-assisted 3-dimensional modeling techniques; and more particularly, to image-order rendering based on 3-dimensional data sets using volume ray casting as applied to operations of complex telecommunications or computer networks.

BACKGROUND OF THE INVENTION

In complex systems such as telecommunications or computer networks, system performance is influenced by a huge number of variables. Optimizing system performance frequently depends on detecting the presence of a particular set of variables, and gaining an understanding of its behavior. The determination of whether, for example, a particular trend or pattern of importance is present in the variables, can be accomplished by measuring the system variables, and then presenting the results conventionally in terms of numerical data values in print media or on a monitor. These materials usually are voluminous, however, and a visual inspection of the data does not readily reveal the presence of any trend of interest. To the vast majority of human viewers, the numerical portrayals are abstractions from which it is difficult or impossible to derive or discover needed useful information on critical characteristics.

To make possible a quick comprehension of the inner structure of data sets, and particularly to detect characteristics, trends and patterns within a many-variable system, visual analogs of the dataset are finding increasing use. For example, as described in the Bell Labs News, p. 2, Dec. 18, 1997, pictorial representations can be created which show details of interest regarding telecommunications network operation that otherwise are buried in large databases. The pictorial display greatly facilitates a viewer's ability to discern the presence of critical characteristics or patterns in the data. By way of illustration, in the real-time operation of a telecommunications network it is critical to know the changing dynamics of traffic buildup along routing paths; and to take action to reroute traffic to avoid blocking. A pictorial display allows even a lay viewer to make the determination.

The pictorial formats must be calculated as efficiently as possible, however, in order to allow real time operation or simply to conserve computer time. Efficient calculation methodology is therefore a prerequisite.

In 3-dimensional modeling, a selected three of the n-subsets present in a dataset are combined into a 2-dimensional presentation which has the visual attribute of appearing as a 3-D figure. Certain datasets are especially amenable to a 3-dimensional modeling technique known as volume rendering. The process is a low-albedo approximation to how volume data generates, scatters, or occludes light energy. Specifically, effects of the light interaction at each data set location are integrated continuously along the viewing rays according to the following equation:

$$I(x\omega) = \int_0^T e^{-\int_0^s \partial(s)ds} I(t)dt \qquad (1)$$

where $\vec{\chi}$ is the origin of the ray, $\vec{\omega}$ is the unit direction vector of the ray, $\partial(s)$ is the differential attenuation at $\vec{\chi}+s\vec{\omega}$, and I(t) is the differential intensity scattered at $\vec{\chi}+t\vec{\omega}$ in the direction $-\vec{\omega}$. Volume rendering in accordance with Eq. (1) can be performed with object-order, image order or domain techniques. In the volume approach, 3-D models of the surface are represented by 3-D volume rasters. A regular volume raster consists of the intersection points of three grids, each point being a sample point or "voxel" in 3-D space. The underlying continuous model of the subject can be reconstructed from the discrete voxel values according to the sampling theorem.

The most widely-used image-order rendering method is called volume ray casting as described, for example, in the article by M. Levoy, *Display of Surfaces from Volume Data*, IEEE Computer Graphics & Applications 8, 5 (May 1988). The volume ray casting computation typically is divided into three steps: (1) traversing and uniform sampling along the ray; (2) shading the sampling points according to an illumination model to get the color of the sampling points; and (3) compositing the sampling points to derive the final color of the voxel.

One of the main problems in volume ray casting is that use of uniform sampling wastes much time in transversing empty or homogeneous regions. Several optimization techniques to avoid time-intensive calculations appear in the literature. One is the pyramid structure described by M. Levoy, *Efficient Ray Tracing of Volume Data*, ACM Transactions on Graphics 6, 1 (July 1990). A second is the empty space skipping approach described by R. Yagel and Z. Shi in *Accelerating Volume Animation by Space-leaping*, IEEE Visualization '93 Proceedings, October, 1993. A third is importance sampling described by J. Dauskin and P. Hanrahan in *Fast Algorithms for Volume Ray Tracing*, 1992 ACM Workshop on Volume Visualization, October 1992. The optimization of the required calculations involved in several approaches by using wavelet transforms has also been attempted.

SUMMARY OF THE INVENTION

The process of volume rendering using volume ray casting is greatly accelerated according to the invention by using a wavelet transform in a unique way to provide a multi-resolution frame for the data sets. The calculation steps begin by first applying the 3-D discrete wavelet transform on the volume. Following this step, an "index" volume is pre-computed with the same resolution as the original volume to indicate the necessary sampling distance at each voxel. The sampling distance is decided by checking the magnitudes of the different resolution wavelet coefficients affecting that voxel. If the standard sampling distance is d, and the magnitudes of all the relevant wavelet coefficients from level −1 to −L are below a user-specified error bound e, then the appropriate sampling distance is $2^L d$. During ray casting, the original spatial volume is traversed, and the next index volume is used to decide the next appropriate sampling distance. Volume image rendering using the wavelet-assisted volume ray casting process of the present invention proceeds faster by almost a factor of 10 than its predecessor processes.

DETAILED DESCRIPTION OF AN ILLUSTRATIVE EMBODIMENT

Figure 1:
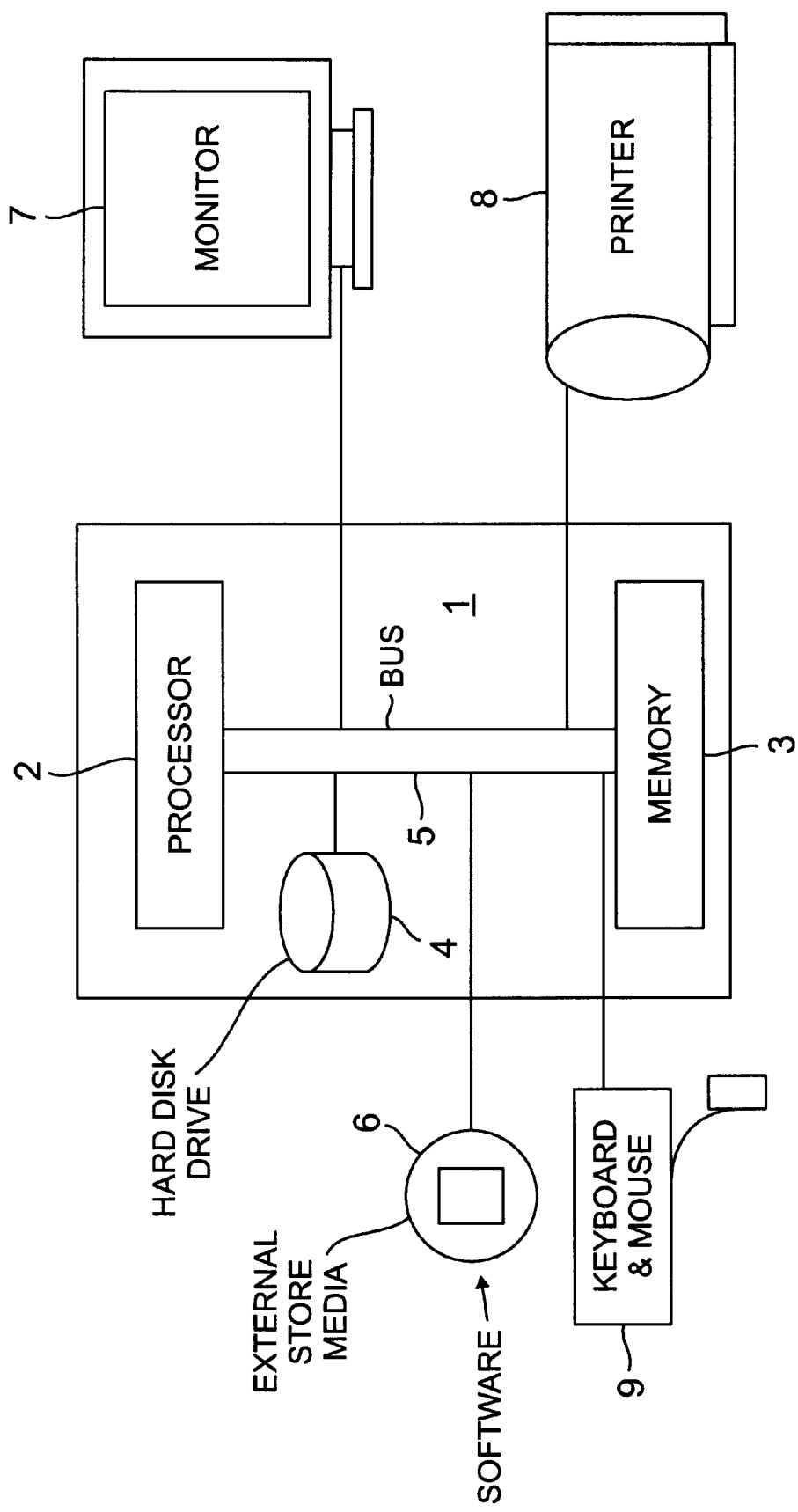
FIG. 1 shows the components of a typical computer or data processing unit.
Figure 2:
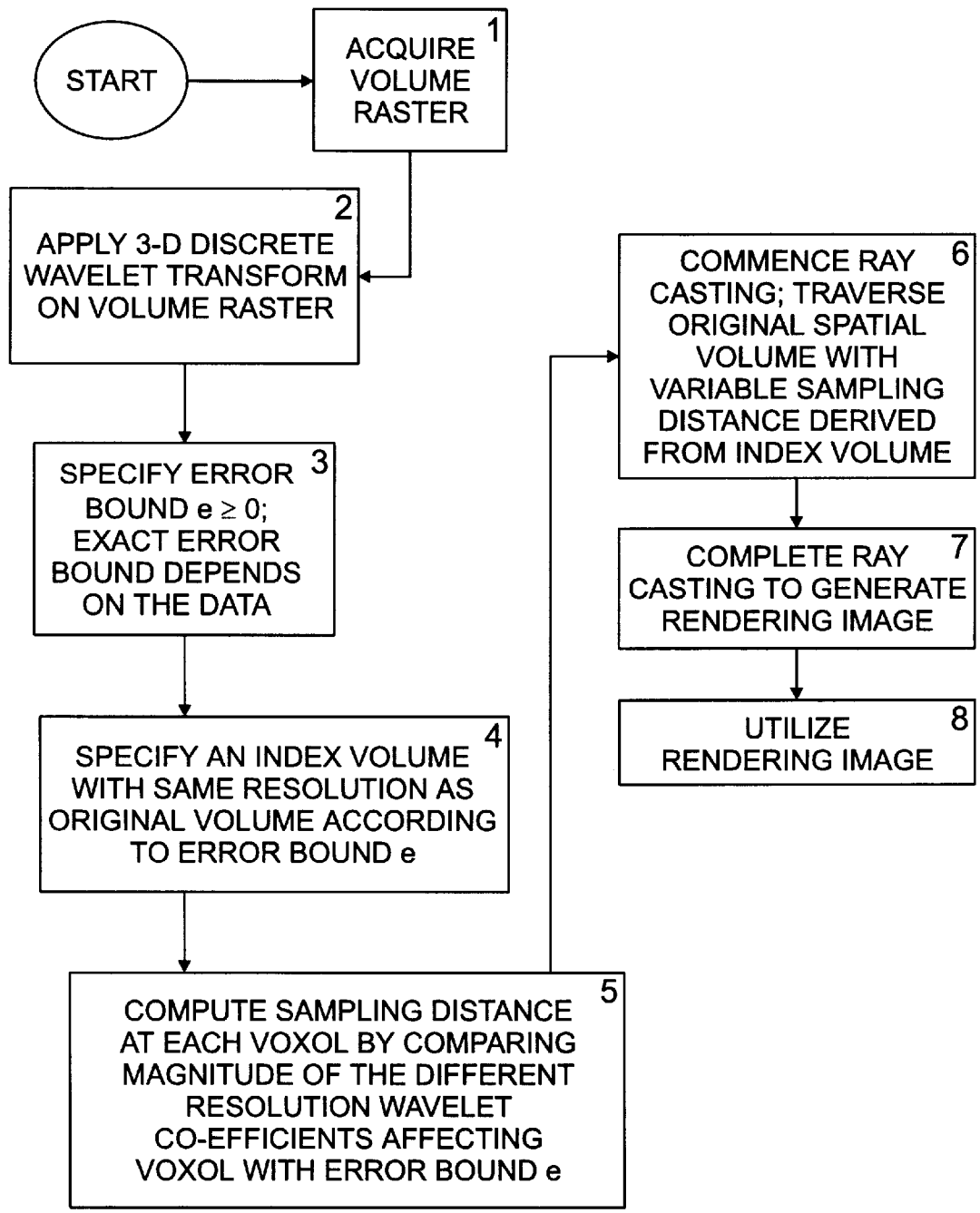
FIG. 2 is a flowchart of steps implementing volume ray casting assisted by the wavelet transform.

FIG. 1 shows an arrangement of apparatus exemplifying a typical computer set-up for laboratory or commercial use. The computer set-up essentially is a data processing system ("DPS") denoted 1. DPS 1 includes a processor 2, a memory 3 and secondary storage 4 which is a machine-readable medium such as a hard disk drive shown in FIG. 1. These components are interconnected by internal bus 5. Memory 3 may include volatile memories (DRAM, SRAM); and non-volatile memories (ROM, FLASH, EPROM and EEPROM). An external storage 6 consists of machine-readable media such as floppy discs, removable hard drives, magnetic tape, CD-ROM, or other computers. The arrangement also includes a monitor 7, a printer 8 and mouse/keyboard 9, all connected to bus 5.

External storage 6 exemplifies media on which software for practicing the invention may be incorporated. Persons skilled in the art will recognize that a wide range of choices exist for mounting the totality of software in a given computer installation. The operating system software, and software for executing the invention herein, can be stored in memory 3, secondary storage 4 and/or external storage 6. Executable versions of computer software can be read from non-volatile memory in memory 3, external storage 6 and/or secondary storage 4. The executable software may loaded for execution directly into volatile memory; or may be executed directly out of non-volatile memory; or alternatively, stored in secondary storage 4 prior to loading into volatile memory for execution. The data processing system is incorporated into the controller 41 of FIG. 8, as will be described hereinafter.

The central idea of the present invention is to improve volume rendering processes run on computers, by utilizing the spatial-frequency locality of the wavelet coefficients to detect the maximum local frequency; and from the latter to detect the appropriate sampling rate that generates good quality volume rendering in less time than standard algorithms require. The expedient used in the invention, described in full detail below, is to create an "index volume" that has the same resolution as the original volume. The index volume information is applied to perform adaptive-sampling ray casting computations in the spatial domain. The volume rendering therefore can be approximated in a fast but controlled process.

An appreciation of how the wavelet transform can be adapted to provide a tool that greatly accelerates computer operations on data sets used in volume rendering, requires some explanation of the wavelet transform itself, and of wavelet-assisted volume ray casting. These explanations follow.

As is described, for example, by S. G. Mallat, in "*A Theory for Multiresolution Signal Decomposition: The Wavelet Representation*", IEEE Transactions on Pattern Analysis and Machine Intelligence 11, 7 (July 1989), multi-resolution signal analysis decomposes a function into a smooth approximation of the original function and a set of detailed information at different resolutions. let $L^2R$ denote all functions with finite energy; the smooth approximation of a function $f \in L^2(R)$ at any resolution $2^i$ is a projection denoted as $A_{2^i}: L^2(R) \to U_{2^i}$, $U_{2^i} \in L^2(R)$, and the detail of $f$ at any higher resolution $2^j$ is a projection of $f$ onto a subspace $O_{2^j}$ of $L^2(R)$ denoted as $P_{2^j}: L^2(R) \to O_{2^j}$, $j \geq i$. Consequently, the finest detailed information is contained in $P_{2^j}$ with the highest resolution. By choosing the appropriate projection functions, it may be demonstrated that: $U_0 = L^2(R)$ and $L^2(R) = \oplus_{j=1}^{\infty} O_{2^j} \oplus U_{2^i}$. It can be proven that there are two families of functions as follows:

$$\psi_{j,n} = 2^{-j/2}\psi(2^j t - n)_{n \in Z} \qquad (2)$$

$$\phi_{j,n} = 2^{-j/2}\phi(2^j t - n)_{n \in Z}$$

which constitute the basis of $U_{2^j}$, and $O_{2^j}$, respectively. $\psi_{j,n}$ are called wavelets and $\phi_{j,n}$ are the corresponding scaling functions. The wavelet coefficients are defined for as follows:

$$d_{j,k} := \int_{-\infty}^{+\infty} \psi_{j,k}(x) dx = \langle f, \psi_{j,k} \rangle \qquad (3)$$

$$c_{j,k} := \int_{-\infty}^{+\infty} \phi_{j,k}(x) dx = \langle f, \phi_{j,k} \rangle$$

In practice, instead of calculating the latter product in Eq. (3), a pyramidal algorithm is applied for the decomposition of the function shown in (a) of FIG. 3, where $\overline{H}(n) = H(-n)$ and $\overline{G}(n) = G(-n)$. H corresponds to a low pass filter (projection $A_{2^j}$); and G corresponds to a high pass filter (projection $P_{2^j}$). By repeating the algorithm, both the discrete detail signal and the discrete approximation at resolution $2^j$ can be computed. Using the same pair of filters, the original discrete samples can be reconstructed by the reverse pyramidal algorithm, as shown in (b) of FIG. 3.

Figure 3:
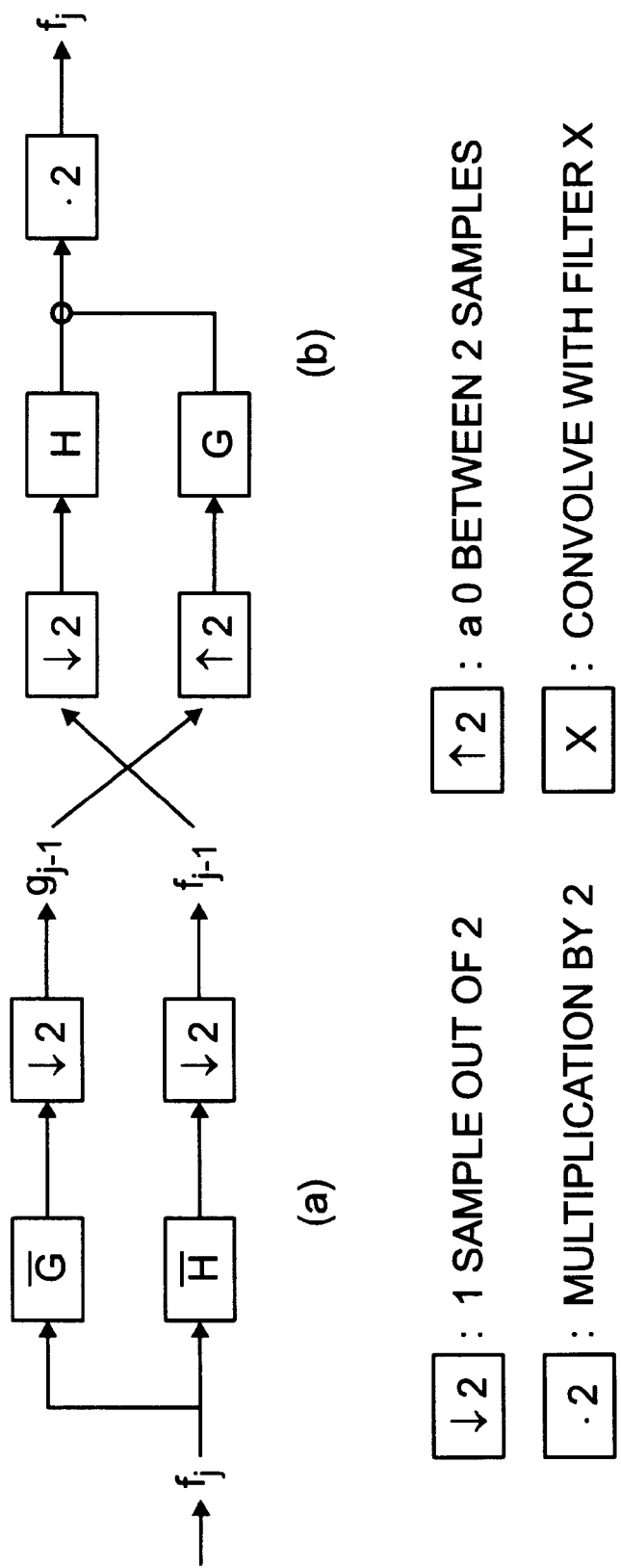
FIG. 3 is a schematic diagram of wavelet deconstruction and reconstruction.

Wavelet theory can be easily expanded to any dimension by constructing high dimension wavelets using the tensor product of several subspaces of $L^2(R)$, as set forth by S. Muraki in *Volune Data and Wavelet Transform*, IEEE Computer Graphics & Applications 13, 4 (July 1993). To decompose or reconstruct a 3D volume, the one dimensional pyramidal algorithm described in (a) of FIG. 3, is applied sequentially along the principal axes. Since the convolution along each axis is separable, for a volume of size $n^3$ the decomposition and reconstruction can be implemented in $O(n^3)$time, which is asymptotically optimal. The smooth approximation of a volume at resolution $2^{j+1}$ decomposes into a smooth approximation at resolution $2^j$ and the discrete detail signals along seven orientations. When the wavelets and scaling functions are orthogonal, the multi-resolution representation has the same total number of samples as the original function.

Prior work in using wavelets for the purpose of volume visualization has been undertaken. Wavelet transform has been applied to volumetric data sets as described in the Muraki reference (above). An approximate solution to the volume rendering equation (1) using orthogonal wavelet functions is described in the article by M. H. Gross et. al. entitled "*A new method to approximate the volume rendering equation using wavelet bases and piecewise polynomials*", Computer & Graphics 19, 1 (1995). Volume rendering combined with wavelet-based compression is described in the article by R. Westermnnn entitled "*A Multiresolution Franework for Volume Rendering*" 1994 Symposium on Volume Visualization (October 1994). These methods, however, do not contain expedients for accelerating the computations. The spatial information is reconstructed from the wavelet coefficients on-the-fly, which dramatically slows down the rendering process. The direct evaluation of the volume rendering equation thus is expensive in terms of calculation time.

Figure 4:
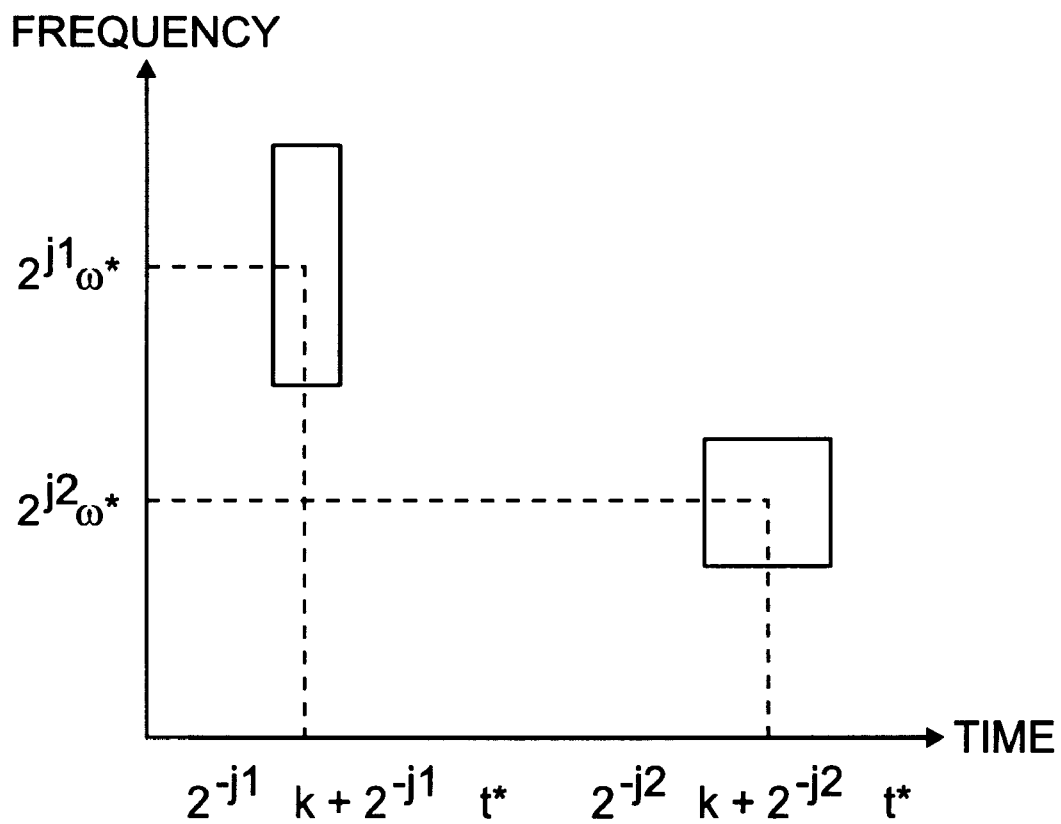
FIG. 4 is a diagram illustrating a time (spatial) frequency window.

The basic idea in accordance with the invention is that during volume ray casting, the appropriate sampling rate along a certain ray is determined by the maximum local frequency. Higher frequency means high sampling rate, and vice versa. To derive the relationship between the appropriate sampling distance and the local frequency, the assumption is made in accordance with conventional volume rendering that the input signal is band-limited and properly sampled. In other words, the continuous signal represented by the volume can theoretically be perfectly reconstructed. It is further assumed that the standard sampling frequency along a certain ray is $f$, and $f$ is above the Nyquist frequency of a volume V along this ray. When the 3D discrete wavelet transform is applied to the volume V, V will be decomposed into a set of smooth wavelet coefficients c at resolution $2^{-M}$ and a set of detailed wavelet coefficients d at different resolutions, from $2^{-M}$ to $2^{-1}$. V can be perfectly reconstructed from the summation of the inner product (multiplications) of these coefficients and the corresponding scaling functions and wavelets, which are the 3D extensions of those defined in Eq. (2). Unlike the cosine and sin waves used by Fourier transform methods, for example, wavelets have local decay in both time(spatial) and frequency domain, i.e., they have time(spatial)-frequency locality. Mathematically, for a wavelet $\psi_{j,k}$ as defined in Eq. 2, there exists a so called time(spatial)-frequency window as reported by C. Chui, in *An Introduction to Wavelets, Academic Press*, 1992:

$$[2^{-j}k+2^{-j}t^*-2^{-j}\Delta_\psi, 2^{-j}k+2^{-j}t^*-2^{-j}\Delta_\psi]X[2_j\omega^*-2^j\Delta_\psi,2^j\omega^*+2^j\Delta_\psi] \quad (4)$$

where $\psi$ and its Fourier tranform $$\hat{\psi}$$

are window functions with centers and radius given radius given by $t^*, \Delta_\psi, \omega^*, \Delta_\psi$, respectively. It can be clearly seen from the time-frequency window that as the level j decreases from –1 to –M, the time (space) window is getting larger and larger, and the frequency window is getting narrower and narrower. This fact is illustrated in the time (spatial) frequency window of FIG. 4. Eq. (4) demonstrates that wavelets at level j represent the localized information in the frequency window $[2^j\omega^*-2^j\Delta_\psi, 2^j\omega^*+2^j\Delta_\psi]$, so the highest frequency is $2^j\omega^*+2^j\Delta_\psi$. From Shannon's sampling theorem, that means the Nyquist frequency for the wavelets is halved when j is decreased by 1. In other words, the sampling distance can be doubled without introducing aliasing. This derivation can be extended to 3D.

The relationships between the wavelet coefficients and the sampling distance along the ray are described in "*A Multiresolution Framework for Volume Rendering*, R. Westermann, 1994 Symposium on Volume Visualization (October 1994). In the Westermann algorithm, a volume is first transformed into wavelet domain and all the wavelet coefficients are saved in a run length encoded linear array. During ray casting, at each sample point along the ray the wavelet coefficients are traversed from the fmest to the coarsest level. Only those coefficients which influence the actual sample, i.e., those having magnitudes above a certain threshold, are examined. For each of these, the coefficient is multiplied with the basis wavelet function and added to the sample value. Given an actual sampling distance, one can decide exactly up to which frequency the signal can be reconstructed without introducing aliasing according to Shannon's sampling theorem, and in turn decide up to which level the wavelet coefficients should still contribute to the sampling.

To avoid the expensive traversing in and reconstructing from the wavelet domain entailed in the Westermarm approach, the present invention employs a pre-computed index volume which has the same resolution as the original volume. The index volume is used to determine the necessary sampling distance at each voxel. This sampling distance is decided by checking the magnitudes of the different resolution wavelet coefficients affecting that voxel. If the standard sampling distance is d, and the magnitudes of all the relevant wavelet coefficients from level –1 to –L are below a user specified error bound e, then the appropriate sampling distance is $2^L d$. This relation is based on the above-developed derivation. The relevance of the coefficients is decided by the time (space) window in Eq. 4. In the real implementation, it is decided by the length of the filter support of the filters in FIG. 3.

Figures 5, 6:
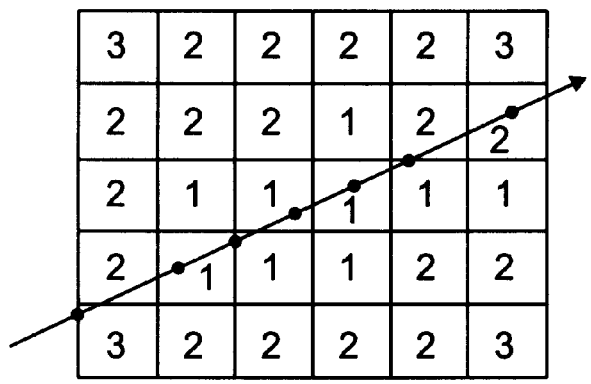
FIG. 5 is a matrix showing index volume values.
FIG. 6 is a table showing rendering times realized.

The wavelet-based volume ray casting algorithm of the present invention is based on the preceding analysis. First, apply the 3-dimensional discrete wavelet transform on the original volume; then create an index volume according to e. During ray casting, traverse the original spatial volume, and use the index volume to decide the next appropriate sampling distance. This process is illustrated in FIG. 5. Note that in FIG. 5, instead of saving the appropriate sampling distance $2^L d$ at each voxel, only an integer L needs to be saved. Since L is at most $\log_2 N$ for an $N^3$ volume, only 4 bits per voxel are needed to save the indexes. This allows handling of the volumes up to the size of $(32768)^3$, far exceeding the normal volume size. A small power look-up table is created to save the actual sampling distance multiplier $2^L$.

The biggest advantage of the present algorithm is the combination of spatial and wavelet domain rendering. The time consuming on-the-fly data method of the prior art, involving reconstruction from wavelet coefficients is avoided by directly performing sampling in the spatial data. Wavelet coefficients are applied to assist the standard volume rendering by providing the information on the appropriate sampling rate at each position. Since the index volume is a flat structure with the same resolution as the spatial volume, it can be traversed simultaneously with the spatial rays. Therefore, unlike using the traditional pyramid approach mentioned earlier, there is no need to use the expensive step of traversing an octree. Compared to the existing empty space jumping algorithms, the present approach can not only skip the empty/homogeneous space, but will also automatically adjust the sampling distance according to the band limits of local space. The present invention does not assume any artificial subdivision of the low frequency area (e.g., the boundary of an octree); and takes full advantage of the elegant multi-resolution frame provided by the wavelet transform.

The relative efficacy of the present invention is demonstrated in the following example, in which the wavelet-assisted volume ray casting algorithm is applied to a public domain volume visualization system developed at State University of New York at Stony Brook, known as "VoVis". The data set is a simulated negative potential of a high potential iron protein; and is published in R. Avlia et. al., "*VolVis: A Diversified Volume Visualization System*", IEEE Visualization '94 Proceedings (October 1994).

All the experiments were conducted using an SGI 02 computer equipped with a 174 MHz IP32 processor and 128 MB of main memory. The size of the dataset is 64×64×64, and the scalar density value ranges from 0 to 255. The size of all the images is 150×150. The protein molecule data is first rendered with the standard high quality uniform-sampling ray casting algorithm provided by VolVis, and the results are used as the reference image. The choice of the underlining wavelets, in particular their smoothness and compactness, influence the spatial and frequency localization. Therefore, the Haar wavelet, the Daubechies wavelets, and the Battle-Lemarie wavelets were all included for comparison.

The rendering time of the standard process is 9.58 sec. In contrast, the rendering time of the present process is summarized in the table of FIG. 6. For Haar wavelets, the time saving ratio ranges from 28% when e=1 to 76% when e=10; for Daubechies, from 15% to 76%; and for Battle-lemarie, from −7% to 88%.

As just demonstrated, volume image rendering using the wavelet-assisted volume ray casting process of the present invention proceeds faster by almost a factor of 10 than its predecessor processes. As a consequence, rendering images obtained from the present process have substantial utility in applications where the images must be derived and created in near-real time. An almost limitless number of instances exist where complex variables relating to real-time processes in the physical, molecular, chemical, electronic and other science or engineering fields can be advantageously represented in 3-dimensional data sets. Accordingly, many applications of the new algorithm can readily be envisioned.

Figure 7:
FIG. 7 is a pictorial representation produced by wavelet-assisted volume ray casting.

Similarly, the ways in which the dataset may be presented visually to reveal its inner structure are likewise numerous. Presented in FIG. 7 strictly for purposes of illustration is one example: a wavelet-assisted volume ray casting of a negative potential of a high potential iron protean wherein the images "a", "b", and "c" are obtained using thresholds 0.0, 0.5, and 1.0; and image (d) is a standard ray casting image of the same datasets.

Figure 8:
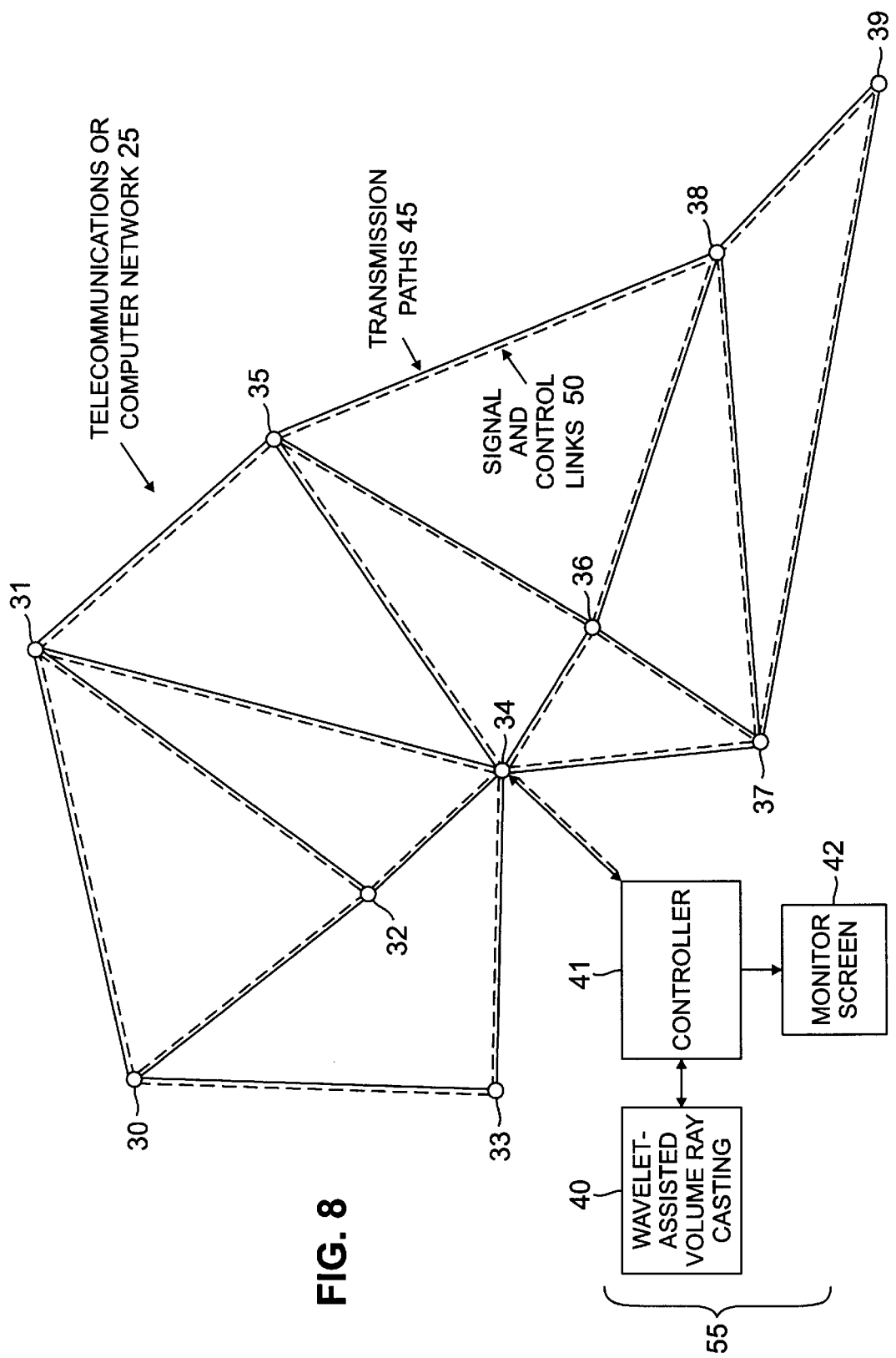
FIG. 8 is a schematic diagram showing a telecommunications network and associated network traffic management center.

A significant application of enhanced speed volume rendering of the present invention is in the operation of complex telecommunications or computer networks where, for example, it is critical to understand the dynamics of traffic buildup along routing paths; and to take action to reroute traffic to avoid blocking. Referring to FIG. 8, there is shown a telecommunications or computer network 25, consisting of multiple switching nodes 30–39. At each node there is a switch such as a #5 ESS switch manufactured by Lucent Technologies, Inc. Each node may serve, for example, multiple thousands of voice or data lines (not shown). Network 25 may in turn be connected to multiple other networks (not shown). The node switches are connected by transmission paths 45; and separately by signaling paths 50. A switching management center 55 connected to node 34 monitors traffic on network 25 from data gathered over paths 50; and performs message routing and rerouting in accordance with optimization algorithms based on the measured traffic parameters.

Center 55 includes a controller 41 which can intercept any particular traffic on network 25; and also receives network operating parameters generated in signal links 50. Controller 41 has embedded software for analyzing the parameters and implementing network message routing strategies depending on the current conditions. Computer 40 connected to (or alternatively, part of) controller 41 runs the wavelet-assisted volume ray casting routines in accordance with the present invention. A monitor 42 connected to computer 40 and controller 41 is used to view various rendering images generated by computer 40 in accordance with commands either issued by a center manager or by computer.

Data routinely gathered by a telecommunications network management center such as center 55 to monitor and manage on-going traffic in a complex telecommunications network includes, for example, traffic density, traffic intensity, carried traffic load, routes, and blocks.

To understand the dynamics of such a network as is shown in FIG. 8, a 3-dimensional volume data is constructed as follows. First, three parameters are selected for to visualization: for example, traffic density and intensity on each link, and blocking number on each node. Without loss of generality, the values of these parameters can be normalized into a range between 0 and 1. Then, the domain of these three parameters are used as the three main axes of the volume data space. Specifically, the X-axis corresponds to traffic density, the Y-axis to traffic intensity, and the Z-axis to blocking number. The next step is to assign a distinguishing value to all the nodes and links in the network. For example, all the nodes and links in FIG. 3 could have their labels as their value. Usually, this number will be further associated with a preselected color and translucency during volume rendering. Finally, a volume data of size (m×n×k) is constructed by equally subdividing the corresponding (0, I) parameter space into m, n, and k segments. The value of a specific voxel is therefore decided by the value of the node or link whose parameters are associated with the voxel.

After the construction of the volume data, the wavelet-assisted volume rendering is performed in accordance with the present invention to generate a volume rendered image at a speed that makes possible useful responsive interaction with the network 25. The interpretation of the image depends on the application-dependent transfer functions used during volume rendering. For example, one can find out the major blocking areas by visually interpreting the color and translucency of the voxels in the domain of large blocking. Appropriate action can then be taken to adjust the network.

Figure 9:
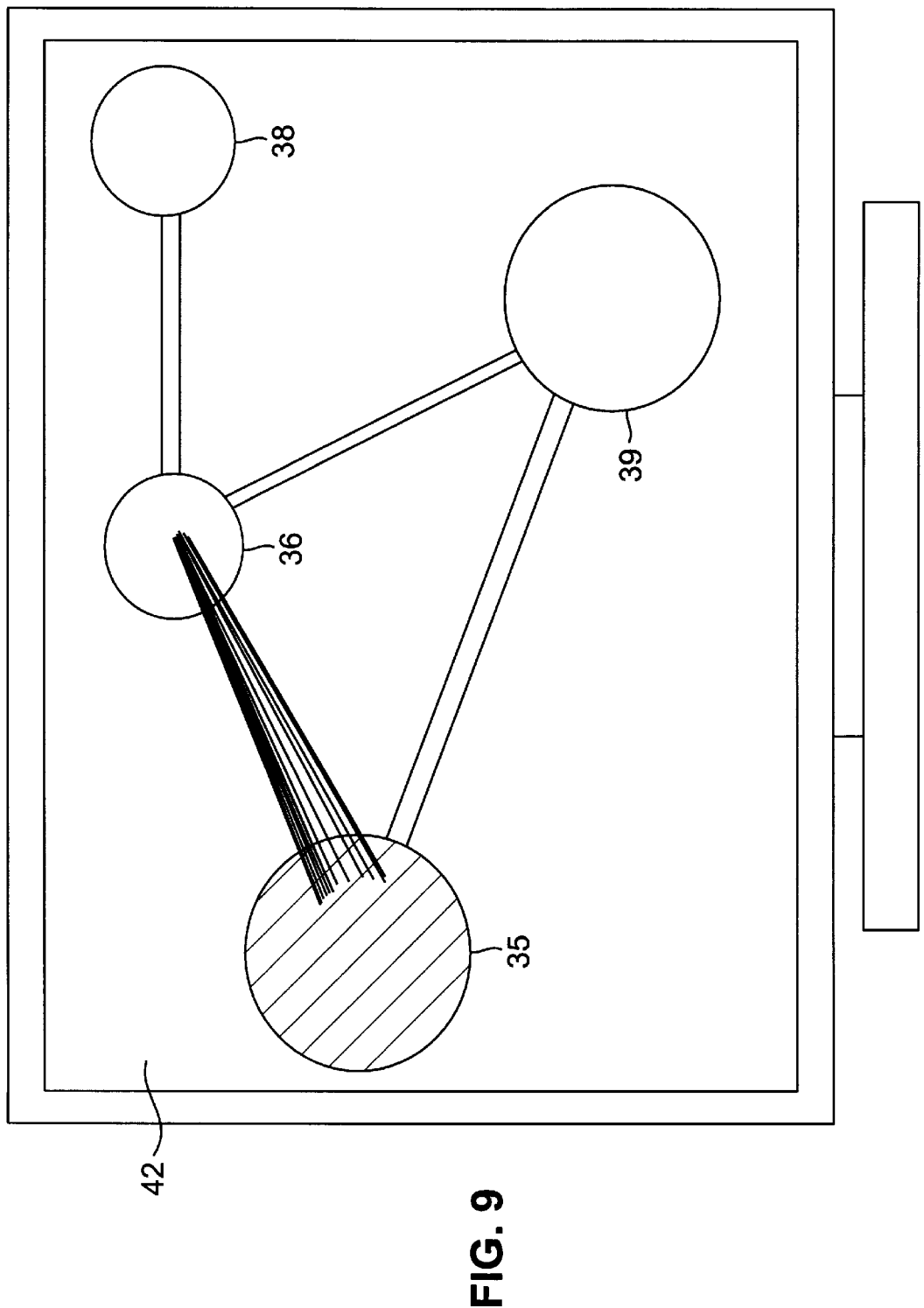
FIG. 9 is a visual presentation of calling rates in a specific period over paths of the telecommunications network, pictorially illustrating usual vs. extraordinary call patterns.

Another use of the application of enhanced speed volume rendering in the operation of complex telecommunications or computer networks, is in monitoring call patterns for possible fraud. Referring to FIG. 9, data reflecting the time-varying call density, call intensity and normal carried traffic load between nodes 36, 37, 38 and 39 of a network is collected over a period of hours and converted to visual images for display on monitor screen 42. A further visual representation of call density and intensity defined as normal for the routes, is represented by the thickness, color or intensity of internode connectors 61, 62, 63. If actual traffic is substantially within the norms, the internode connector display is invariant. If an abnormal traffic pattern emerges from the data, it is displayed as a 3-D "pipe" 64 on the path between nodes 35 and 36. Unusually heavy calling activity are revealed to an attendant as dense coloration around the affected nodes. Further investigation may reveal that some of the calls emanating from node 35 are fraudulent.

A further use of enhanced speed volume rendering in the telecommunications art is in the study of radio frequency interference conditions within the cells of a cellular telephone system. Where optimally to locate the cellular transmitter, is critically dependent upon the RF interference conditions as measured or estimated for each of the arbitrarily small unit areas which in aggregate make up the cell or cells to be served. The range of frequencies at which the RF interference is greatest and least in each of the unit areas may be more readily appreciated by converting the local RF interference data to a 3-D picture. The X-Y dimension is an exact terrain map of the contiguous areas in which a cellular transmitter is to be situated. The Z-dimension is radio spectrum; and the variable is the degree of interference present in each unit area in selected ranges the RF spectrum.

To the human observer of the pictorial display, the subject of interest generally is the RF interference pattern at different frequencies. For example, at some locations within the X-Y dimension of the cell site, there might exist higher RF interference at high frequencies, but medium RF interference at low frequencies. These kind of pattern should be clearly seen from the pictorial data display. A human observer of the 3-D presentation is able to discern patterns and concentrations of low vs. high RF interference clusters, and thus make educated estimates of the optimal locations for one or more cellular transmitters within the overall terrain.

Figure 10:
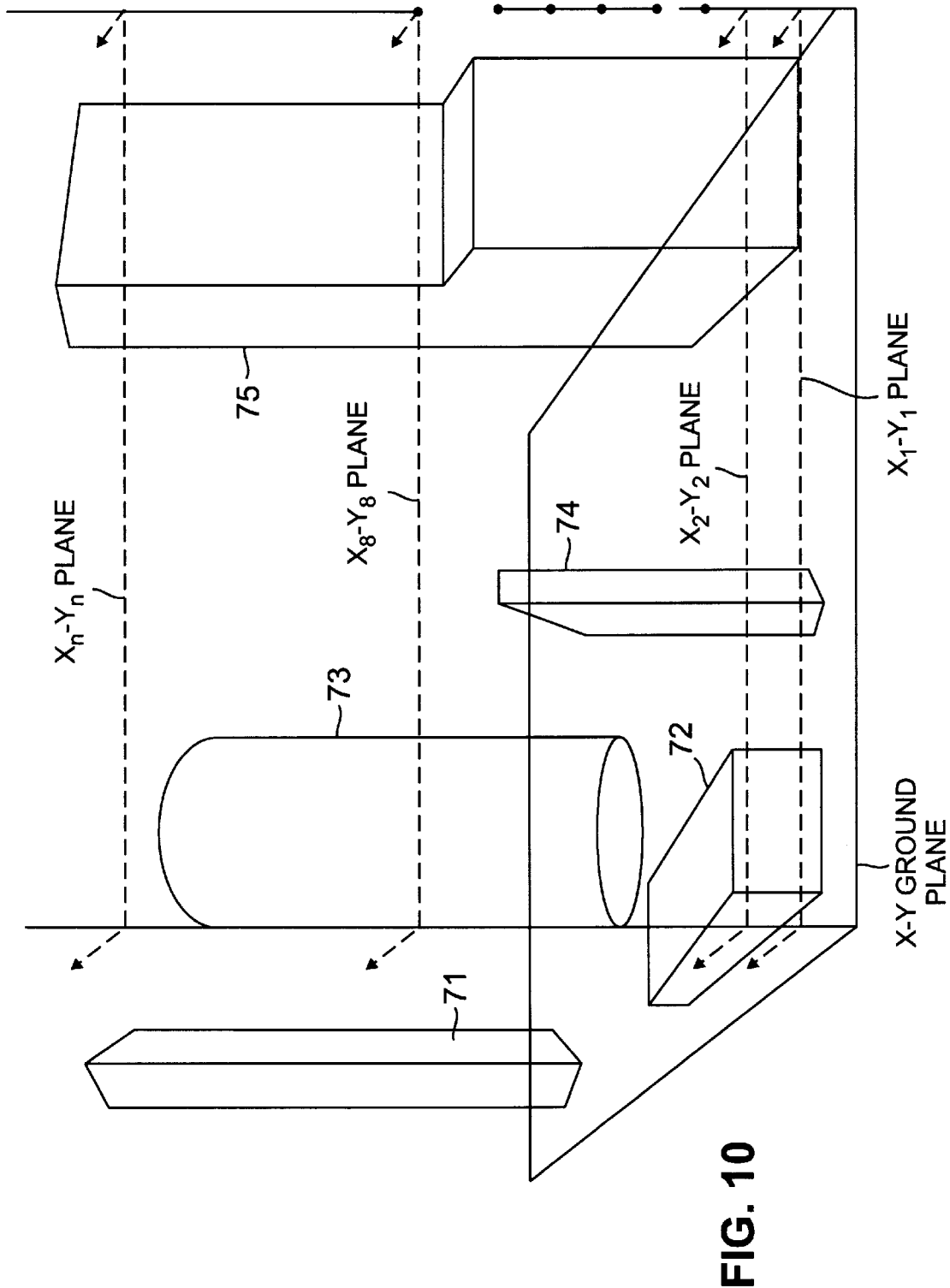
FIG. 10 is a schematic diagram representing a cellular telephone cell site.

An example of a typical urban cell cite is depicted in FIG. 10 as having vertical buildings and structures 71, 72, 73, 75, 75 rising to various heights from a ground-level X-Y plane. Cell telephones may be used anywhere in the ground plane, and also at any height above it by users in the buildings 71–75. Accordingly, values of RF interference levels must be determined at locations along the X-Y ground plane; and also at locations in the elevation view within the buildings. At each (X,Y,Z), the RF interference is measured. The value of the function f(X, Y, Z) is the RF interference. Thus, only one 3-dimensional picture is needed to depict all of the information as to RF interference in the cell area.

Measurements are made and recorded with portable testers throughout the ground plane at intervals of 1–2 feet; and also within and around the perimeter of each vertical structure at the intersections with vertically spaced horizontal planes X1-Y1 . . . Xn-Yn. Alternatively or additionally, the RF interference data may be estimated based on terrain variables such as blocking material, height above ground place, etc. The affect of the landscape thus is reflected in the interference statistics.

Importantly, because RF interference in the cell volume can vary substantially as structures are added, removed or altered, it is advantageous to simulate the affects of such changes upon the measured RF interference data. Since a large number of possible combinations of such changes may arise in future development, the measured RF data can be "aniated" by calculating RF interference based on the original terrain data augmented with location, size and material data for each of the possible combinations of assumed changes. A very large number of pictorial displays of RF interference data will result; but by concentrated visual inspection of the totality, an experienced technician can determine where the RF interference is (or will be) the least;, and accordingly can propose a transmitter site to take advantage of that estimate. Fast volume rendering is a particular advantage in this application.

Although the preceding example illustrates the use of the invention to optimally locate the cell transmitter, it is also useful to apply the invention to the selection of transmission frequencies.

What is claimed is:

1. In a network comprising multiple switching nodes interconnected by multiple transmission paths between and among said nodes, said network further comprising:

network operational data monitoring means connected to said nodes and paths for collecting network operational data;

a computer controller connected to said monitoring means;

a set of software instructions running on said computer controller for converting said network operational data to 3-dimensional representations of selected characteristics of said network operational data;

said instructions including code for executing a process of volume rendering using volume ray casting in which said process includes creating an original volume of sample voxels and 3-dimensional discrete wavelet transforms with coefficients; and a screen monitor for displaying said selected characteristics of said network operational data;

a process executed in said computer controller for reducing the time needed to create said 3-dimensional representations, CHARACTERIZED IN THAT: said software instructions contain code for accelerating said volume ray casting by creating a variable sampling distance to look for data points along each said ray, said code executing the steps of:

applying said 3-dimensional discrete wavelet transforms to said original volume;

setting a user-defined error bound e;

precomputing an index volume having the same resolution as said original volume according to said error bound e;

"calculating the spatial-frequency locality of said wavelet coefficient;"

using maximum local frequency, set said sampling distances by computing discrete sampling distances for said voxels by comparing the magnitude of the wavelet coefficient affecting each said voxel with said error bound e;

attaching at each voxel of said original volume said computed discrete sampling distance;

performing volume ray casting calculations on said original volume data set with repeated iterations using said voxel-specific variable sampling distances attached to said index volume; and creating from the results of said iterations a representation of a 3-dimensional image of said selected network operational data characteristics.

2. The process of claim 1, further CHARACTERIZED IN THAT:

in assigning to each voxel of said index volume a discrete sampling distance, said sampling distance is set to be shorter for voxels having a low frequency of occurrence in said index volume, and longer for voxels having a high frequency of occurrence in said index volume.

3. The process in accordance with claims 1 or 2, further CHARACTERIZED IN THAT:

said network operational data is traffic data measured through each said switching node and each said transmission path; and said 3-dimensional image is an updated composite image of the density of all said traffic data occurring through each said switching node and each said transmission path.

4. The process in accordance with claims 1 or 2, further CHARACTERIZED IN THAT:

said network operational data comprises data representing originating call norms for the current time and date through each said switching node and each said transmission path; and said 3-dimensional image is composite image consisting of said originating call norms and the current originating call counts through each said switching node and each said transmission path as measured by said network operational data monitoring means.

5. A in accordance with claim 1, further CHARACTERIZED IN THAT:

said network is a communications network; and said process comprises the further step of displaying said representation of said image on said screen monitor.

6. A non-volatile storage medium containing computer software instructions encoded in a machine-readable format, for enabling a computer running said instructions to convert network operational data to 3-dimensional representations of selected characteristics of said network operational data, said instructions including code for executing a process of volume rendering using volume ray casting in which said process includes creating an original volume of sample voxels and 3-dimensional discrete wavelet transforms with coefficients; CHARACTERIZED IN THAT:

said computer software instructions contain code for accelerating said volume ray casting by creating a variable sampling distance to look for data points along each ray, said code executing the steps of:

applying said 3-dimensional discrete wavelet transform to said original volume;

setting a user-defined error bound e;

precomputing an index volume having the same resolution as said original volume according to said error bound e;

"calculating the spatial-frequency locality of said wavelet coefficient;"

using maximum local frequency, set said sampling distances by computing discrete sampling distances for said voxels by comparing the magnitude of said wavelet coefficient affecting each said voxel with said error bound e;

attaching at each voxel of said original volume said discrete sampling distance;

performing volume ray casting on said original volume data set with repeated iterations using said voxel-specific variable sampling distances attached to said index volume; and creating a 3-dimensional image of said selected network operational data characteristics from the results of said iterations.

7. A non-volatile storage medium in accordance with claim 6, further CHARACTERIZED IN THAT:

said network operational data is traffic data of a communications or computer network comprising multiple switching nodes interconnected by multiple transmission paths between and among said nodes.

8. A non-volatile storage medium in accordance with claim 7, further CHARACTERIZED IN THAT:

said 3-dimensional image is a composite image of traffic data density occurring in said network in real time through said switching nodes and said transmission paths.

9. A non-volatile storage medium in accordance with claim 6, further CHARACTERIZED IN THAT:

said network operational data includes data representing telecommunications calling norms for the current time and date for each said transmission path; and said 3-dimensional image is composite image of said telecommunications calling norms and the current call counts on each said transmission path.

10. A non-volatile storage medium in accordance with claim 6, further CHARACTERIZED IN THAT:

said network operational data is RF interference data relating to a discrete cellular telephony cell site; and said 3-dimensional image is the variable RF interference as measured or estimated at specific locations within an X-Y-Z volume of said cell site.

* * * * *